(12) United States Patent
Wardell et al.

(10) Patent No.: US 7,515,297 B2
(45) Date of Patent: Apr. 7, 2009

(54) SYSTEM AND METHOD FOR IMPROVING THROUGHPUT IN PRINTING IMPOSITIONED DOCUMENTS

(75) Inventors: Raymond G. Wardell, Boulder, CO (US); Alan H. Spence, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1138 days.

(21) Appl. No.: 10/056,857

(22) Filed: Jan. 24, 2002

(65) Prior Publication Data

US 2003/0137696 A1    Jul. 24, 2003

(51) Int. Cl.
G06K 15/00 (2006.01)
G06F 11/00 (2006.01)
H03M 13/00 (2006.01)

(52) U.S. Cl. .................. 358/1.6; 358/1.16; 714/52; 714/758

(58) Field of Classification Search ............... 358/1.12, 358/1.15, 1.16, 1.18, 1.14; 715/788; 714/52, 714/746, 758
See application file for complete search history.

(56) References Cited

U.S. PATENT DOCUMENTS

| 5,727,220 | A |  | 3/1998 | Hohensee et al. | |
|---|---|---|---|---|---|
| 5,857,209 | A |  | 1/1999 | Shively | |
| 5,870,766 | A |  | 2/1999 | Shively | |
| 5,923,013 | A | * | 7/1999 | Suzuki et al. | 235/375 |
| 5,926,825 | A | * | 7/1999 | Shirakawa | 715/521 |
| 5,960,164 | A | * | 9/1999 | Dorfman et al. | 358/1.11 |
| 5,963,968 | A |  | 10/1999 | Warmus et al. | |
| 5,982,994 | A | * | 11/1999 | Mori et al. | 358/1.15 |
| 5,983,243 | A |  | 11/1999 | Heiney et al. | |
| 5,987,461 | A |  | 11/1999 | Dreyer et al. | |
| 6,064,397 | A |  | 5/2000 | Herregods et al. | |
| 6,078,403 | A |  | 6/2000 | Palmer | |
| 6,088,710 | A |  | 7/2000 | Dreyer et al. | |
| 6,173,286 | B1 |  | 1/2001 | Guttman et al. | |
| 6,173,295 | B1 |  | 1/2001 | Goertz et al. | |
| 6,175,846 | B1 |  | 1/2001 | Shively | |
| 6,205,452 | B1 |  | 3/2001 | Warmus et al. | |
| 6,292,267 | B1 | * | 9/2001 | Mori et al. | 358/1.15 |
| 6,965,440 | B1 | * | 11/2005 | Nakagiri et al. | 358/1.12 |
| 7,016,063 | B2 | * | 3/2006 | Hama | 358/1.15 |
| 2001/0029530 | A1 | * | 10/2001 | Naito et al. | 709/223 |
| 2002/0051171 | A1 | * | 5/2002 | Hama | 358/1.15 |
| 2002/0147739 | A1 | * | 10/2002 | Clements et al. | 707/500 |
| 2003/0067618 | A1 | * | 4/2003 | Farrell et al. | 358/1.12 |
| 2004/0225773 | A1 | * | 11/2004 | Wang et al. | 710/200 |
| 2007/0168514 | A1 | * | 7/2007 | Cocotis et al. | 709/225 |
| 2007/0279689 | A1 | * | 12/2007 | Aoki et al. | 358/1.16 |

* cited by examiner

Primary Examiner—Jerome Grant, II
(74) Attorney, Agent, or Firm—Duft Bornsen & Fishman, LLP

(57) ABSTRACT

A method, apparatus, article of manufacture, and a memory structure for efficiently printing impositioned documents with using a wide spectrum of resources and document elements is disclosed. A print optimizer and an imposition engine operate cooperatively to generate and managed skeletonized document versions to efficiently effect changes to the impositioned document.

27 Claims, 14 Drawing Sheets

602

702 {
- Begin Resource Group
  - 703 { Begin Resource "M1" (printer marks for front of sheet 1)
    - Begin Image
      - Image Picture Data
    - End Image
  - End Resource
  - Begin Resource "M2" (printer marks for back of sheet 1)
    - Begin Image
      - Image Picture Data
    - End Image
  - End Resource
  - Begin Resource "M3" (printer marks for front of sheet 2)
    - Begin Image
      - Image Picture Data
    - End Image
  - End Resource
  - Begin Resource "M4" (printer marks for back of sheet 2)
    - Begin Image
      - Image Picture Data
    - End Image
  - End Resource
  - Begin Resource "A1" (picture of first insurance agent)
    - Begin Image
      - Image Picture Data
      - Image Picture Data   } 705
      - Image Picture Data
      - Image Picture Data
    - End Image
  - End Resource
- End Resource Group

706 {
Begin Document
　Begin Resource Environment Group
　　Map Data Resource "M1" (printer marks for front of sheet 1)
　　Map Data Resource "M2" (printer marks for back of sheet 1)
　　Map Data Resource "M3" (printer marks for front of sheet 2)
　　Map Data Resource "M4" (printer marks for back of sheet 2)
　　Map Data Resource "A1" (picture of first insurance agent)
　　Map Data Resource "A2", OID 0 (picture of second insurance agent)
　　Map Data Resource "R1", OID 1 (company logo)
　　Map Data Resource "R2", OID 2 (Page 1)
　　Map Data Resource "R3", OID 3 (Page 2)
　　Map Data Resource "R4", OID 4 (Page 3)
　　Map Data Resource "R5", OID 5 (Page 4)
　　Map Data Resource "R6", OID 6 (Page 5)
　　Map Data Resource "R7", OID 7 (Page 6)
　　Map Data Resource "R8", OID 8 (Page 7)
　　Map Data Resource "R9", OID 9 (Page 8)
　　Map Data Resource "R10", OID 10 (Page 9)
　　Map Data Resource "R11", OID 11 (Page 10)
　　Map Data Resource "R12", OID 12 (Page 11)
　　Map Data Resource "R13", OID 13 (Page 12)
　　Map Data Resource "R14", OID 14 (Page 13)
　　Map Data Resource "R15", OID 15 (Page 14)
　　Map Data Resource "R16", OID 16 (Page 15)
　　Map Data Resource "R17", OID 17 (Page 16)

*FIG. 7B*

602 

706 {
    710 { Preprocess Presentation Object OID 0,  90 degree rotation
          Preprocess Presentation Object OID 2,  90 degree rotation
          Preprocess Presentation Object OID 3, 270 degree rotation
              Fully Qualified Name OID 1 (company logo, a tile in the page image)
          Preprocess Presentation Object OID 4,  90 degree rotation
              Fully Qualified Name OID 1 (company logo, a tile in the page image)
          Preprocess Presentation Object OID 5, 270 degree rotation
              Fully Qualified Name OID 1 (company logo, a tile in the page image)
          Preprocess Presentation Object OID 6, 270 degree rotation
              Fully Qualified Name OID 1 (company logo, a tile in the page image)
          Preprocess Presentation Object OID 7,  90 degree rotation
              Fully Qualified Name OID 1 (company logo, a tile in the page image)
          Preprocess Presentation Object OID 8, 270 degree rotation
              Fully Qualified Name OID 1 (company logo, a tile in the page image)
          Preprocess Presentation Object OID 9,  90 degree rotation
              Fully Qualified Name OID 1 (company logo, a tile in the page image)
          Preprocess Presentation Object OID 10,  90 degree rotation
              Fully Qualified Name OID 1 (company logo, a tile in the page image)
          Preprocess Presentation Object OID 11, 270 degree rotation
              Fully Qualified Name OID 1 (company logo, a tile in the page image)
          Preprocess Presentation Object OID 12,  90 degree rotation
              Fully Qualified Name OID 1 (company logo, a tile in the page image)
          Preprocess Presentation Object OID 13, 270 degree rotation
              Fully Qualified Name OID 1 (company logo, a tile in the page image)
          Preprocess Presentation Object OID 14, 270 degree rotation
              Fully Qualified Name OID 1 (company logo, a tile in the page image)
          Preprocess Presentation Object OID 15,  90 degree rotation
              Fully Qualified Name OID 1 (company logo, a tile in the page image)
          Preprocess Presentation Object OID 16, 270 degree rotation
              Fully Qualified Name OID 1 (company logo, a tile in the page image)
          Preprocess Presentation Object OID 17,  90 degree rotation
              Fully Qualified Name OID 1 (company logo, a tile in the page image)
    End Resource Environment Group
  End Document

712B {
 714B {
  716B {
   Begin Document (second customized copy of brochure)
    Begin Page
     Include OBject "M1" (printer marks for front of sheet one)
     Include OBject OID 2, 90 degree rotation, upper right of sheet (Page 1)
       Fully Qualified Name OID 1 (company logo, a tile in the page image)
     Include OBject "A2", 90 degrees rotation, on top of Page 1 (second photo)
     Include OBject OID 4, 90 degree rotation, lower right of sheet (Page 3)
       Fully Qualified Name OID 1 (company logo, a tile in the page image)
     Include OBject OID 6, 270 degree rotation, upper left of sheet (Page 5)
       Fully Qualified Name OID 1 (company logo, a tile in the page image)
     Include OBject OID 8, 270 degree rotation, lower left of sheet (Page 7)
       Fully Qualified Name OID 1 (company logo, a tile in the page image)
    End Page
    Begin Page
     Include OBject "M2" (printer marks for back of sheet one)
     Include OBject OID 3, 270 degree rotation, upper right of sheet (Page 2)
     Include OBject OID 5, 270 degree rotation, lower right of sheet (Page 4)
     Include OBject OID 7, 90 degree rotation, upper left of sheet   (Page 6)
     Include OBject OID 9, 90 degree rotation, lower left of sheet   (Page 8)
    End Page
    Begin Page
     Include OBject "M3" (printer marks for front of sheet two)
     Include OBject OID 10, 90 degree rotation, upper right of sheet (Page 9)
       Fully Qualified Name (company logo, a tile in the page image)
     Include OBject OID 12, 90 degree rotation, lower right of sheet (Page 11)
       Fully Qualified Name (company logo, a tile in the page image)
     Include OBject OID 14, 270 degree rotation, upper left of sheet (Page 13)
       Fully Qualified Name (company logo, a tile in the page image)
     Include OBject OID 16, 270 degree rotation, lower left of sheet (Page 15)
       Fully Qualified Name (company logo, a tile in the page image)
    End Page
    Begin Page
     Include OBject "M4" (printer marks for back of sheet two)
     Include OBject OID 11, 270 degree rotation, upper right of sheet (Page 10)
     Include OBject OID 13, 270 degree rotation, lower right of sheet (Page 12)
     Include OBject OID 15, 90 degree rotation, upper left of sheet (Page 14)
     Include OBject OID 17, 90 degree rotation, lower left of sheet (Page 16)
    End Page
   End Document

*FIG. 7E*

SYSTEM AND METHOD FOR IMPROVING THROUGHPUT IN PRINTING IMPOSITIONED DOCUMENTS

BACKGROUND OF THE INVENTION

1. Field of the Invention

The present invention relates to systems and methods for rendering documents, and in particular to a system and method for improving the throughput in rendering impositioned documents.

2. Description of the Related Art

Impositioning refers to the process by which multiple pages are printed on a single sheet of paper in a particular order so that they come out in the correct sequence when cut and folded. The printing of an impositioned document typically involves manipulation of the document, printing, making adjustments to render the document as desired, reprinting the document, making additional adjustments. This process is repeated until the document is rendered as the user desires.

This process reduces the productivity, especially because the time to reprint can be lengthy. Further, the process of sending multiple versions of large documents such as books (which comprise a large subset of documents that are printed with impositioning techniques) creates excessive network communications traffic from the impositioning client to the print server, and from the print server to the printer. Also, it can be difficult to enforce version control to keep up with a multitude of documents with small changes. There is no automated way to assure that changes are reflected in the imposed document other than sending all the data again. This further reduces productivity during the time the user is waiting for reprints.

Further, in many cases, it is desirable to include variable data in impositioned documents. For example, it may be desirable to print a book wherein each copy of the book includes customized data in particular fields. Current impositioning systems do not support the efficient use of variable data.

What is needed is a system and method for improving throughput in printing impositioned documents. The present invention satisfies that need.

SUMMARY OF THE INVENTION

To address the requirements described above, the present invention discloses a method, apparatus, article of manufacture, and a memory structure for printing an impositioned document having at least one resource. The method comprises the steps of receiving source data; receiving a job ticket generated from the source data, the job ticket having a first identifier identifying a resource of the document and layout information describing a layout of the resource in the document; generating an second identifier associated with the resource, the second identifier locally recognizable by a printing device; storing the second identifier remotely from the printer; storing the resource locally to the printer; and printing the stored resource according to the layout information. In one embodiment, the stored resource is printed by generating a printfile having only mapping data structures; transmitting the printfile to a print server; generating a skeleton document having a first structured field defining a presentation of the resource (IOB) and a second structured data field (MDR) identifying the resource; invoking the loaded resource according to the first structured field and the second structured field; and rendering the document using the skeleton document and the loaded resource.

BRIEF DESCRIPTION OF THE DRAWINGS

Referring now to the drawings in which like reference numbers represent corresponding parts throughout:

FIGS. 7A-7E are diagrams of an exemplary skeleton document.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
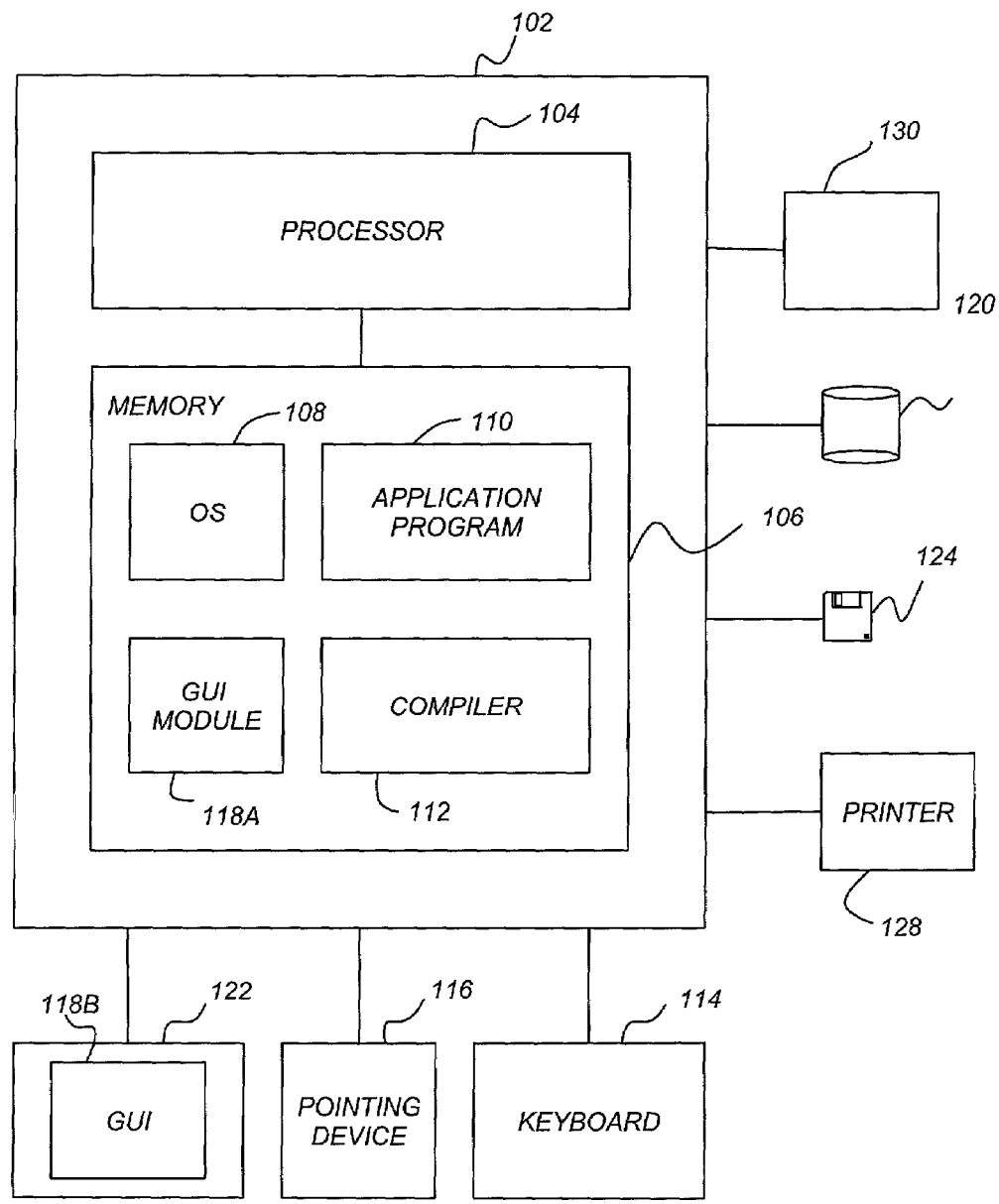
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows the application program 110 written in a programming language such as COBOL, C++, FORTRAN, or other language to be translated into processor 104 readable code. After completion, the application program 110 accesses and manipulates data stored in the memory 106 of the computer 102 using the relationships and logic that was generated using the compiler 112. The computer 102 also optionally comprises an external communication device 130 such as a modem, satellite link, Ethernet card, or other device for communicating with other computers.

In one embodiment, instructions implementing the operating system 108, the application program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the application program 110 are comprised of instructions which, when read and executed by the computer 102, causes the computer 102 to perform the steps necessary to implement and/or use the present invention. Application program 110 and/or operating instructions may also be tangibly embodied in memory 106 and/or data communications device(s) 130, thereby making a computer program product or article of manufacture according to the invention. As such, the terms "article of manufacture," "program storage device" and "computer program product" as used herein are intended to encompass a computer program accessible from any computer readable device or media.

The computer 102 is also communicatively coupled to a printer 128. The computer 102 can render images of data stored therein using printer driver software disposed in the computer 102 and/or the printer 128. The computer 102 can also communicate with network devices such as a network printer via communication device(s) 130.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
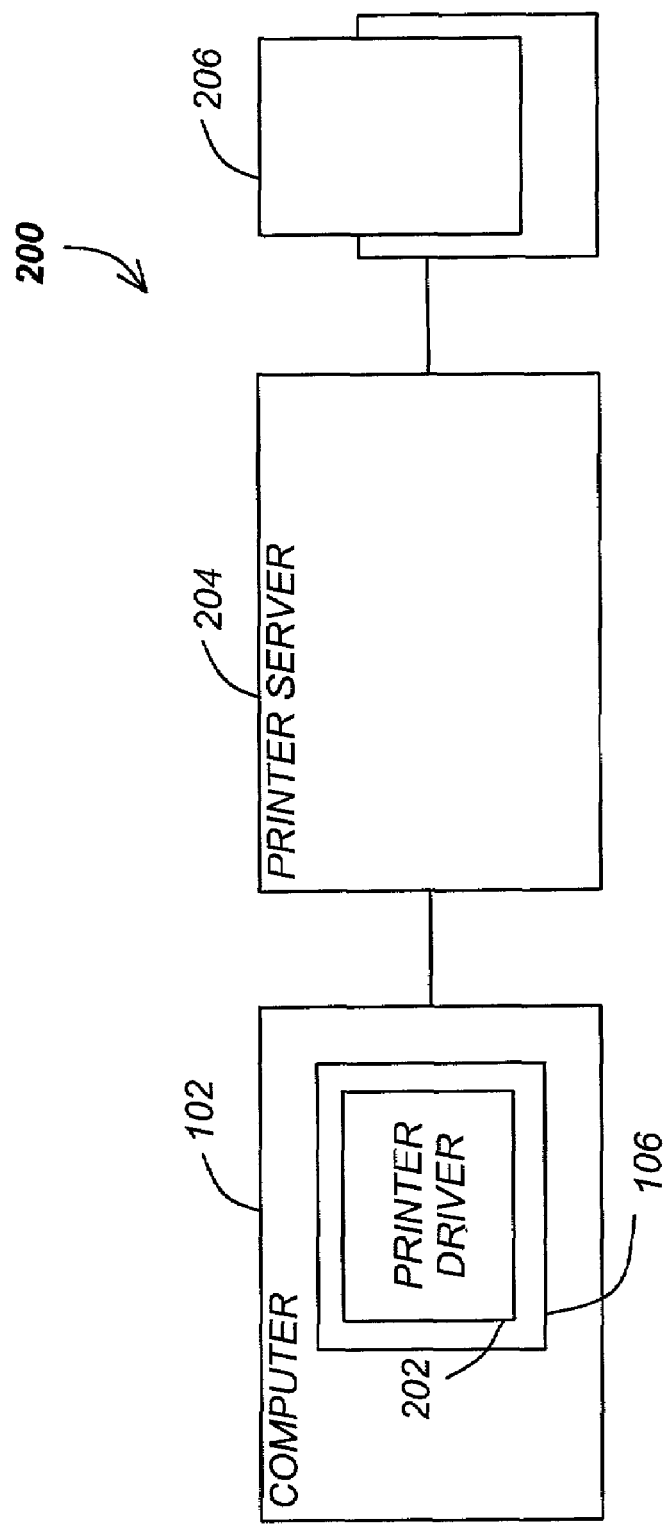
FIG. 2 is a diagram showing a prior art printing system suitable for impositioning printing.

FIG. 2 is a diagram showing a prior art printing system 200 suitable for impositioning printing. The printing system 200 comprises a computer 102 having a memory 106 with a printer driver 202. The printer driver accepts data from the application programs, and processes the data in a format suitable for providing commands to a printer server 204. The printer server 204 accepts data transmitted from the printer driver 202 and generates commands and data to the printer 206. Typically, when an impositioned document is changed and reprinted, the printer driver 202 and the printer server 204 must regenerate the document each time, and transmit the resulting data to the printer 206. It is possible to raster image process (RIP) a page description language such as POSTSCRIPT to an AFP (Advanced Function Presentation) to take advantage of high performance printers supporting the IPDS (Intelligent Printer Data Stream) format. Unfortunately, this technique introduces delay (from the RIP process) and the sending of data from the client computer 102 to the server 204 (which data must change any time any data is changed) introduces unnecessary data traffic and congestion. Further, the IPDS architecture does not allow more than eight pages on a sheet, so signatures and other resources must be either broken up into smaller signatures or pages must be combined into "logical pages" in the source data stream. As a consequence, ease of use and overall throughput are badly degraded.

Another possible solution to this problem is to separately download source data from the client computer 102 to the printer server 204, and then provide some options to modify the source data at the printer server 204. Unfortunately, this approach requires a very large investment on the part of the printer 206 vendor to provide just a subset of impositioning capability. Performance issues from the printer server 204 to the printer 206 are not addressed, nor is version control, and neither of the foregoing alternatives is suitable for integration with variable data applications.

Figure 3:
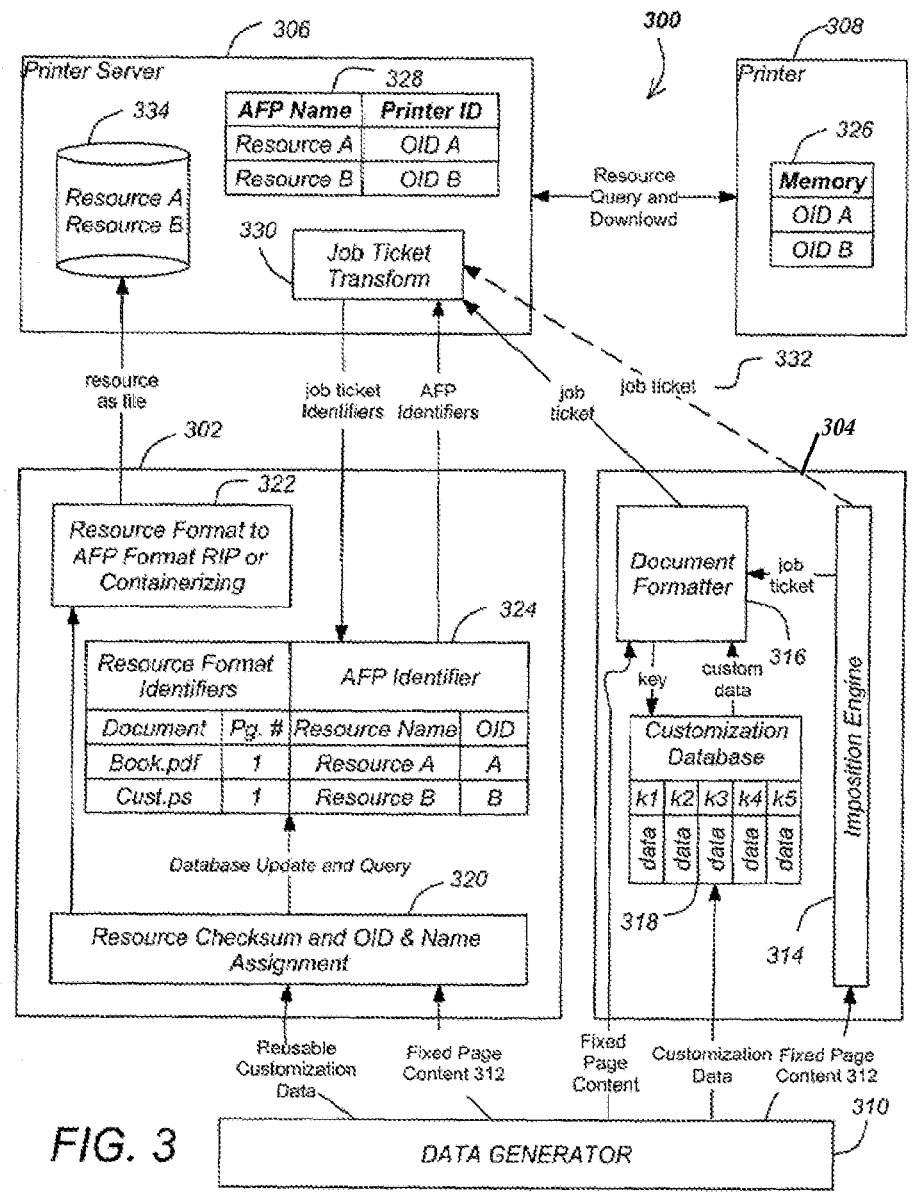
FIG. 3 is a diagram of an improved impositioning printing system.

FIG. 3 is a diagram of an improved impositioning printing system (IIPS) 300. The IIPS 300 comprises a printer server 306 communicatively coupled to a printer 308, a print optimizer 302 and an imposition module 304. The imposition module 304 generates job tickets describing the layout of the impositioned document, and includes an imposition engine 314, and optionally, a document formatter 316 and a customization database 318 for implementing variable data in the impositioned document.

The print optimizer 302 includes a resource checking module 320 for determining if a resource provided by the data generator 310 is already associated with an identifier and stored in the printer server 306 and/or a memory 326 of the printer 308. The print optimizer 302 also includes a processing module 322 which containerizes or RIPs (rasterize and print) resources in the impositioned document to a printer-renderable form. The print optimizer 302 also maintains and manages a database 324 which associates resource identifiers with AFP identifiers such as the resource name and object ID.

The printer server 306 includes file storage 334, a mapping 328 between AFP resource names and printer identifiers (object IDs), and a job ticket transformer 330 that transforms the job ticket identifiers into AFP identifiers as more fully described below. Further description of the elements presented in FIG. 3 is provided with respect to the flow charts presented in FIGS. 4 and 5A-5D below.

Figure 4:
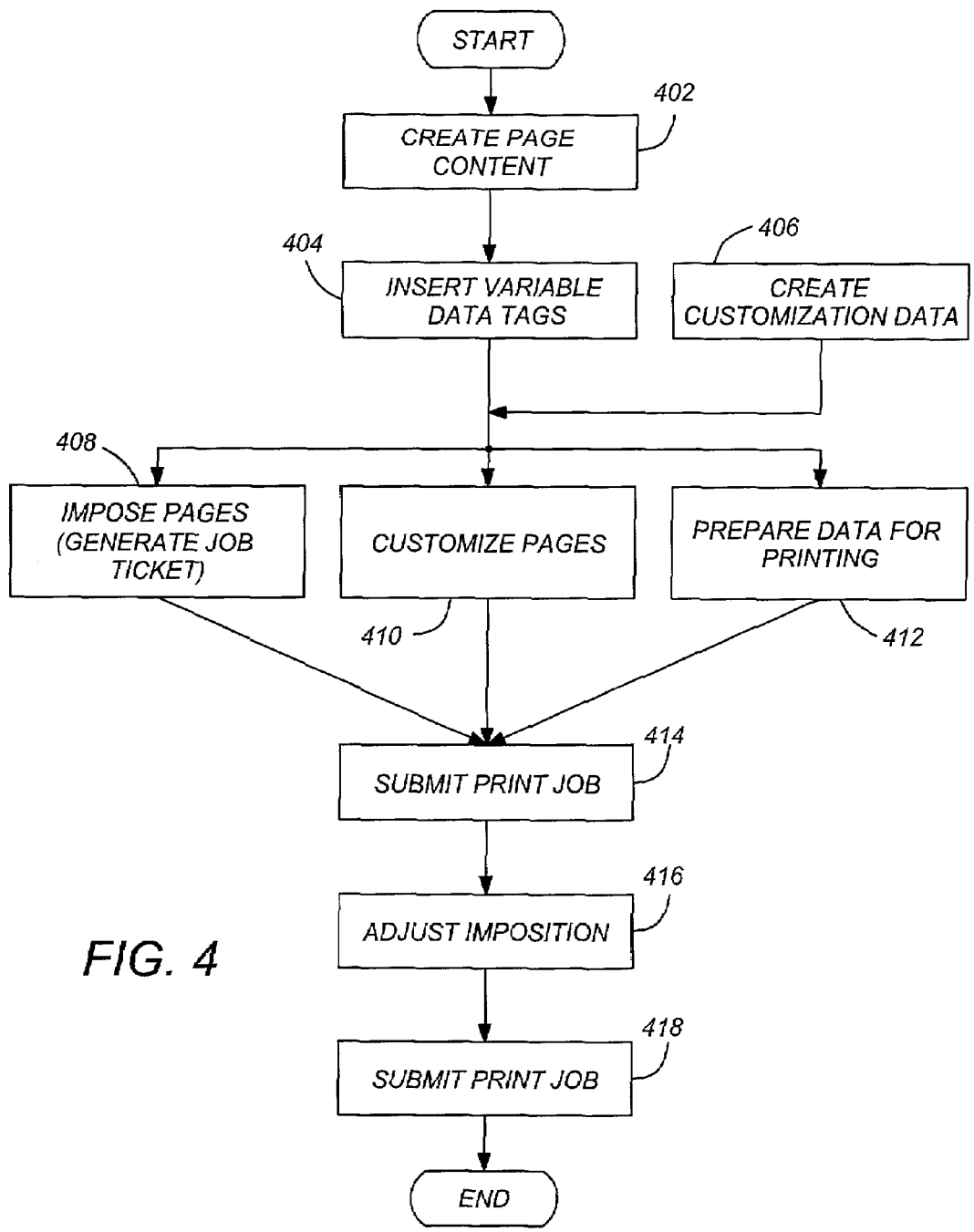
FIG. 4 is a flow chart describing exemplary process steps used to practice one embodiment of the impositioning printing system.

FIG. 4 is a flow chart describing exemplary process steps that can be used to practice one embodiment of the IIPS 300. Source data including page content 312 is created by the data generator (e.g. QUARK or FRAMEMAKER), and provided to the print optimizer 302 and the impositioning module 304. This is illustrated in blocks 404 and 406. If the impositioned document is to include variable data, variable data tags are inserted into the page content and customization data (the variable data to be inserted) is also created, as shown in blocks 404 and 406. The fixed page content 312 is processed (preferably in parallel) by the print optimizer 302 and the imposition module 304.

Referring first to block 408, the imposition module imposes the pages defined by the page content 312, thereby generating a job ticket 332. The job ticket 312 includes a job ticket or resource identifier identifying a resource of the document and layout information describing a layout of the resource in the document. In one embodiment, the job ticket is in the job description or portable job ticket formats.

Referring now to block 412, the source data including the fixed page content is also provided to the print optimizer 302. The print optimizer 302 receives the fixed page content, and checks the content to determine if the resource is a new resource, or if the resource has already been loaded into the printer server 306/printer 308. In one embodiment, this is accomplished by performing a checksum on the incoming fixed page content, and querying the database 324 to compare the result to checksums performed for resources already stored in the printer server 306 or the printer 308. If the checksum matches an existing checksum, a determination is made that the resource is already stored. If the checksum does not match an existing checksum, a determination is made that the resource is a new resource. If the resource is a new resource, the database 324 is updated to include the new resource. This is accomplished by generating an AFP identifier (e.g. an AFP resource name or object ID) in the print optimizer 302, the printer server 306, or the printer 308, and associating the AFP identifier with the resource identifier obtained from the job ticket 332 (e.g. "book.pdf" or "cust.ps"). The AFP identifier may be stored in the printer server 306 or the print optimizer 302, but is preferably stored remotely from the printer 308. If the resource is already in a printer-renderable form (e.g. a natively supported printer format), the resource is stored in the file storage 334 of the printer server. If not, the resource is processed by a raster image processor (RIP) or containerized to generate a resource file, and then stored in the file storage 334 of the printer server. The printer server 306 queries the printer 308 to determine if the resource is already stored in the printer 308. This is accomplished by comparing a mapping between the identifier used by the printer (object ID) and the AFP identifier. If the resource has not been stored in the printer memory 306, the resource is downloaded and stored.

Returning to FIG. 4, the print job is submitted, as shown in block 414, and the printer 308 prints the document having the stored resource according to the layout information provided in the job ticket. If a change in impositioning is desired, the impositioning is adjusted and a second print job can be submitted, as shown in blocks 416 and 418.

FIGS. 5A-5D are flow charts providing additional details regarding the foregoing operations.

Figure 5A:
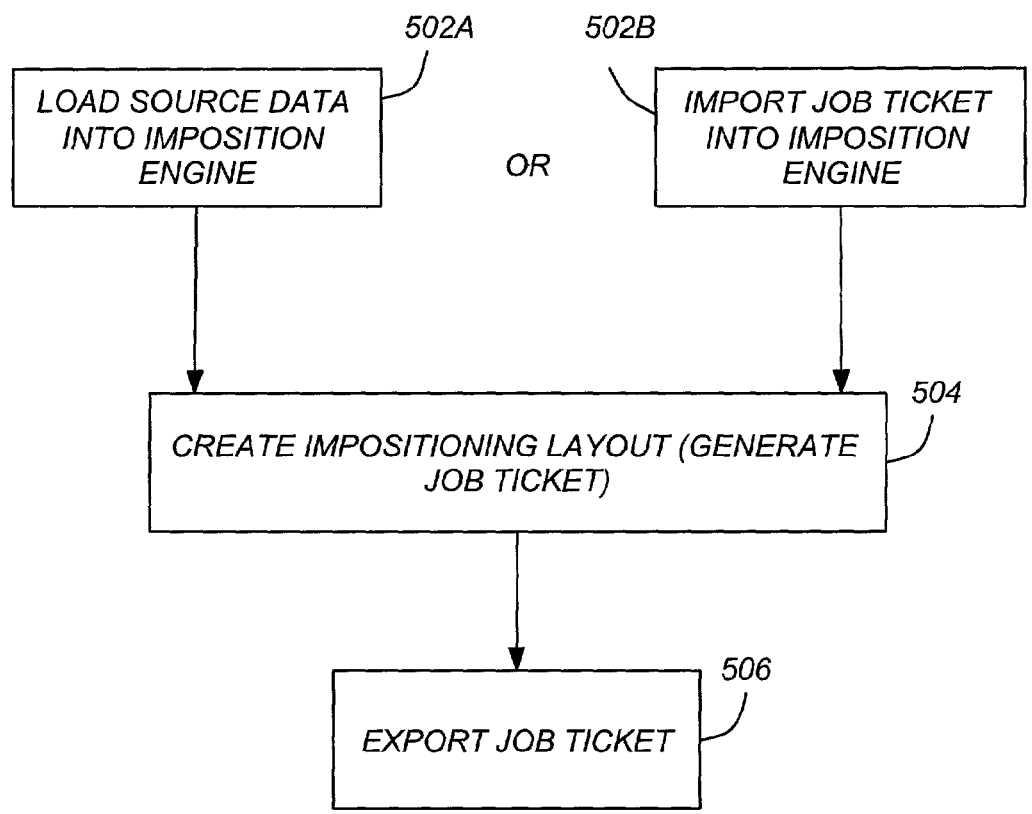
FIGS. 5A-5D are flow charts further describing the operations described in FIG. 4.

FIG. 5A is a flow chart describing the operations performed in block 408 in greater detail. The present invention can be implemented such that new job tickets are generated for each printing of the impositioned document, or such that existing job tickets are imported and modified to reflect impositioning changes. If there is no existing job ticket or if a new job ticket describing a new or altered impositioned document is required, source data is loaded into the impositioning engine 314 of the impositioning module 304, as shown in block 502A. If there is an existing job ticket requiring modification, the existing job ticket is imported into the impositioning engine 314 as shown in block 502B. An impositioning layout is then created by generating a job ticket, as shown in block 504. The term "job ticket" as used herein refers to any data structure having resource identifiers and layout information describing a layout of the resource in the document as it will be printed when impositioned. The job ticket is then exported from the impositioning module 304, as shown in block 506. The job ticket is provided to a job ticket transformer 330, which determines the AFP identifier (resource name or printer object identifier) from the resource format identifier provided in the job ticket.

Figure 5B:
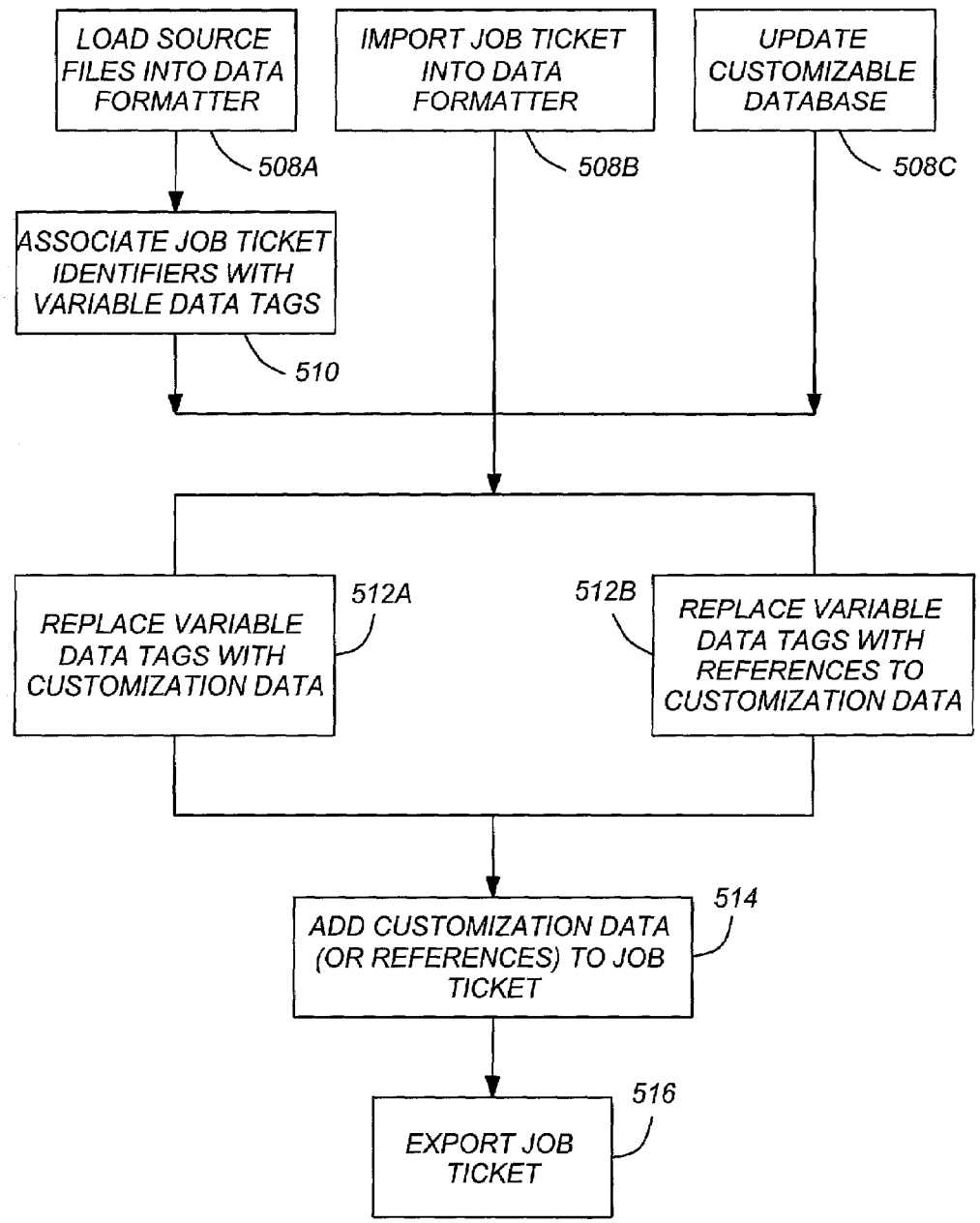

FIG. 5B is a block diagram further illustrating the operations performed in customizing the impositioned document (e.g. those performed in block 410 of FIG. 4). If no job ticket has been created, source data is loaded into the document formatter 316 of the impositioning module 304, and job ticket identifiers are associated with the variable data tags in the impositioned document. The variable data tags identify where variable data is to be inserted. This is depicted in blocks 508A and 510. If a job ticket has already been created, the job ticket can be imported into the document formatter 316, as shown in block 508B. Further, if the only change in the impositioned document is a change in variable data, the customization database can be updated, as shown in block 508C. The variable data tags are then replaced with customization data or references to customization data, as shown in blocks 512A and 512B. In one embodiment, this is accomplished with the use of the customization database 318 which has one or more keys 344 which index columns of data to be inserted at desired places in the document. For example, a customer ID can be used to retrieve a name and address for a personalized form letter.

The document formatter 316 queries the customization database 318 for each key value (k1, k2, etc.) to retrieve the appropriate customization data. Then, the job ticket 332 is augmented to include the customization data, and exported as shown in block 516.

Figure 5C:
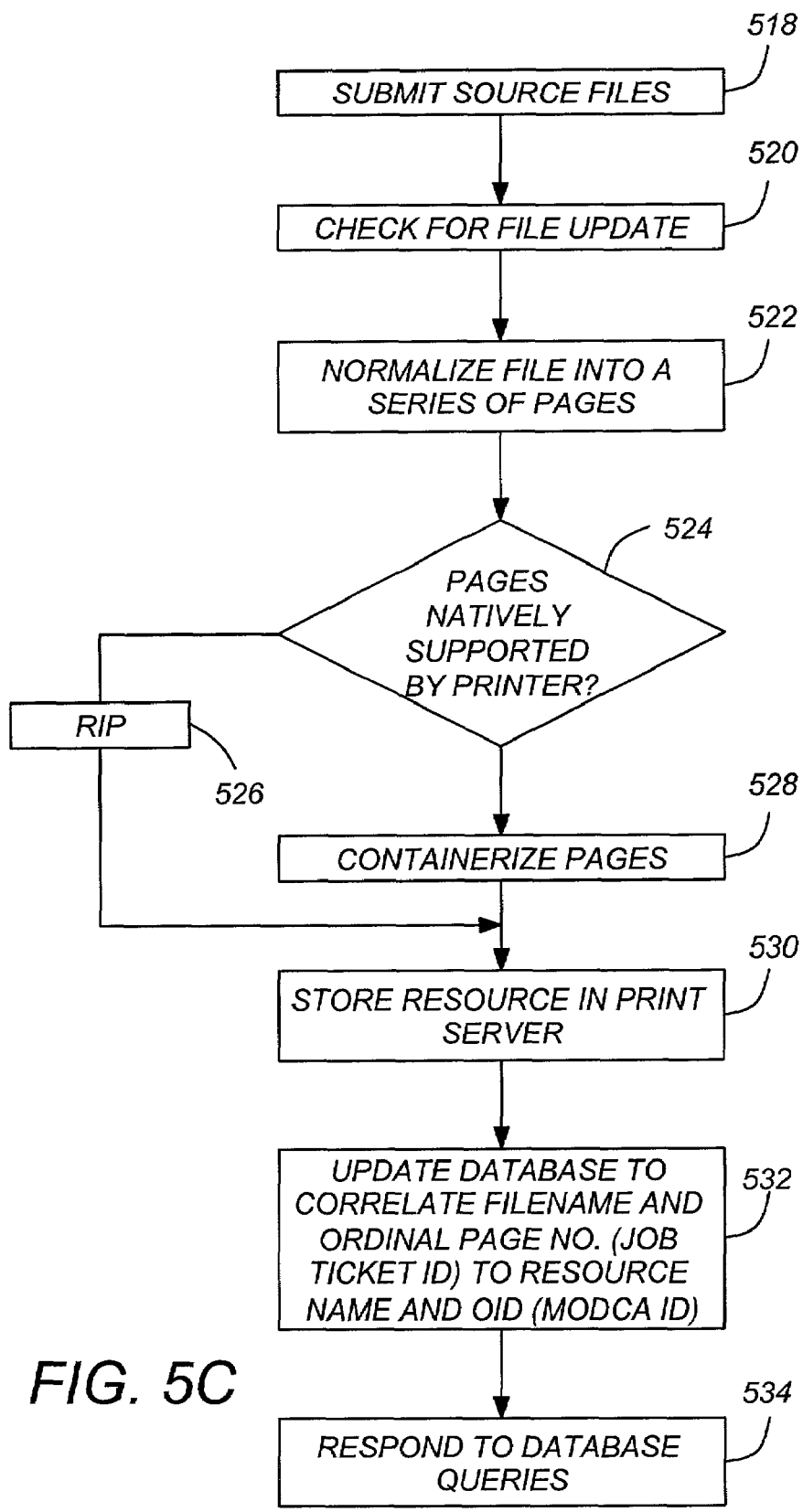

FIG. 5C is a block diagram showing additional detail regarding the process steps performed in preparing the data for printing (e.g., block 412 of FIG. 4). Files having source data are received by the print optimizer 302, as shown in block 518. The source data is checked to determine whether the resource is a new resource (indicating that an update to the database 324 is required). If the resource is new, it is normalized into a series of pages, as shown in block 522.

Documents can include both objects which are natively supported by the printer (printer-captureable) and not natively supported by the printer (non-printer-captureable). Document objects which are suitable for capture (i.e. pages and/or OPI images) are containerized or wrapped in a data structure to assign universally unique object identifiers (OIDs) 328 to the objects. These application-unique resource names 326 and OIDs 328 can be queried by resource name.

Non-printer captureable resources (resources that are not supported by the printer 308) are converted to an image (using, for example, a raster image processor, or RIP in the printer 308) or a command set for printing an image (such as the FS10 command set used in conjunction with the image object content architecture (IOCA)). The image is then associated with a resource name (e.g. Resource B in FIG. 3). These operations are shown in blocks 526 and 528.

The processed resources are then stored in the printer server 306. The database 324 in the print optimizer 302 is then updated to correlate the first identifier from the job ticket (e.g., the file name of the document and page number) and the second identifier (AFP identifier or MODCA ID), as shown in block 532. Thereafter, the print optimizer 302 responds to database queries from the job ticket transformer 330 in the printer server 306 to permit translation of first (job ticket) identifiers to second (AFP or MODCA) identifiers, as shown in block 534.

Figure 5D:
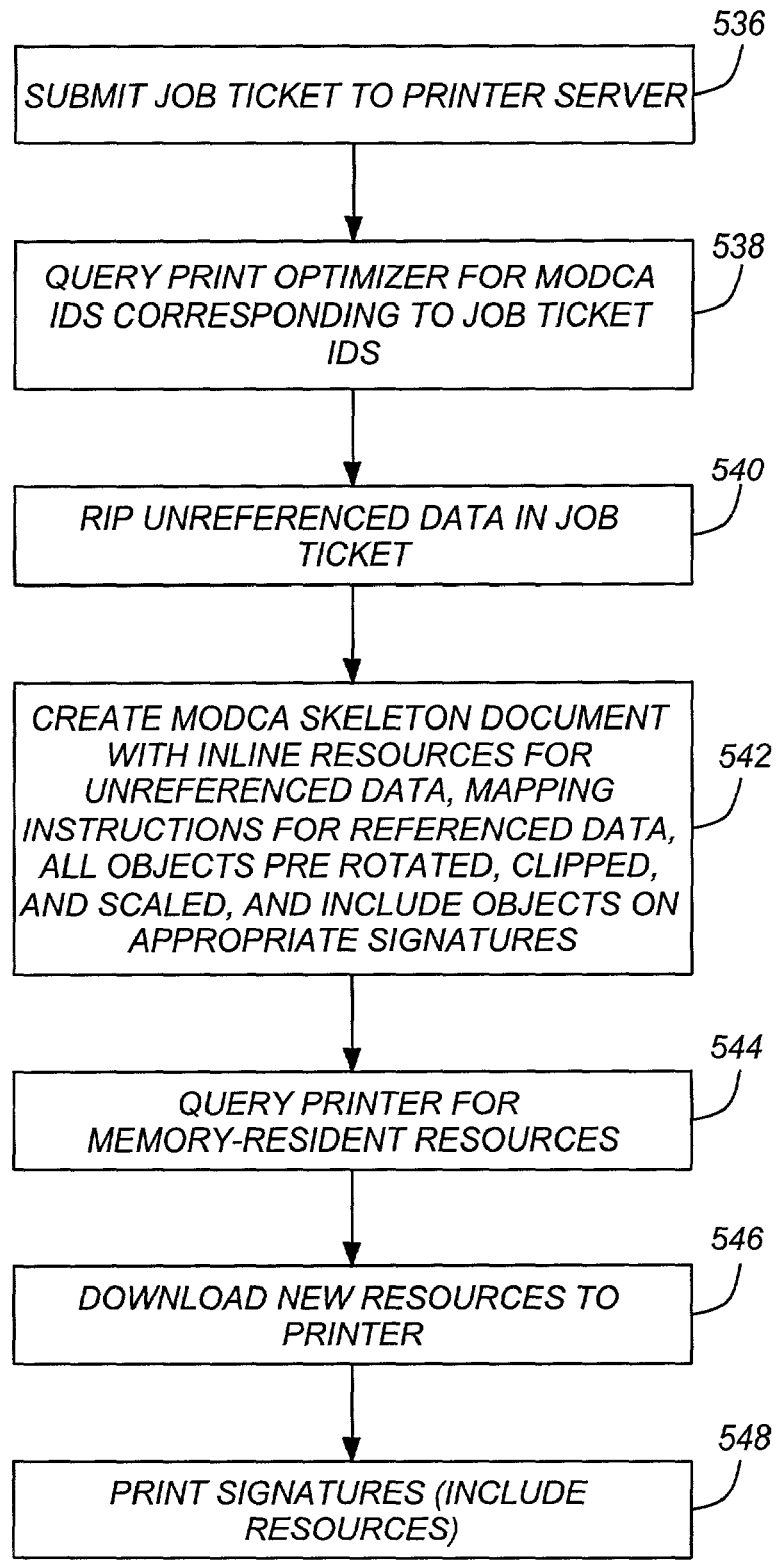

FIG. 5D is a flow chart further illustrating the process steps used in submitting the print job, as shown in block 414 of FIG. 4. A job ticket 332 is received from the imposition module 304 by the printer server 306. The job ticket transformer 330 then transforms the identifiers referencing resources in the impositioned document from the resource identifiers provided in the job ticket to AFP or MODCA, or printer object identifiers by querying the database 324. This is depicted in block 538. Data that is unreferenced in the job ticket is processed, as shown in block 540.

In block 542, a skeleton document is created. The skeleton document includes inline data resources (data residing in the skeleton document itself) for the unreferenced data generated in block 540, and mapping instructions for referenced data (e.g. the OID and the resource name, which is used to find the resource in the file storage 334 disk). Inline resources, if in a format natively supported by the printer, are containerized. Otherwise, the inline resources are RIPed into an image. The skeleton document and the job ticket provide similar information in different formats (the job ticket in a format used by the impositioning engine, and the skeleton document in a format used by the print server). In one embodiment, all resources to be printed are pre-rotated, clipped and scaled, and include objects on appropriate signatures.

Figure 6:
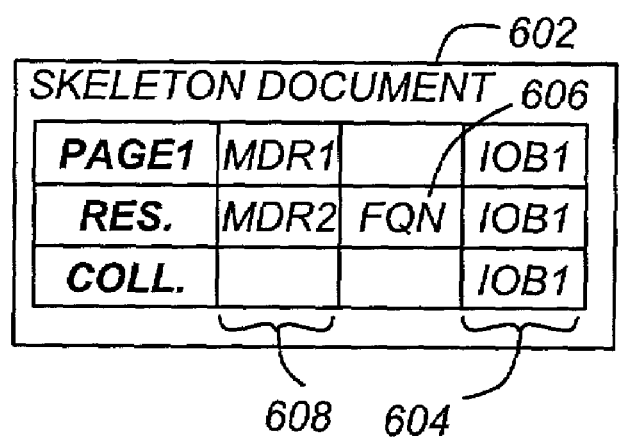
FIG. 6 is a diagram of one embodiment of a skeleton document.

FIG. 6 is a diagram of an exemplary skeleton document 602. The skeleton document 602 includes a first structured field defining a presentation of the resource and a second structured field identifying the resource. In one embodiment, the each source page is mapped with a map data resource (MDR) structured field, and then later included into an include object (IOB) structured field 604. Any additional resources (such as collateral information) are also mapped with MDRs and included as secondary resources specified in fully qualified name (FQN) triplets 606 to the IOB for each page that uses the resource.

In one embodiment, the collateral information is designated as an in-line resource for the printfile and included with IOBs. Such resources can remain in the source format. The resulting AFP data stream is simple and small, thus simplifying the development of AFP drivers, minimizing the processing time required to create an AFP printfile, and minimizing network traffic from the computer 102 to the printer server 306.

The loaded resource is invoked according to the data in the first structured field 608 and the second structured field 604. The document is then rendered using the skeleton document 602 and the loaded resource. If the user desires to modify the document or a presentation thereof, a user command is accepted in the imposition engine 314 via a user interface. The user command is interpreted, resulting in commands to generate a new skeleton document 602.

The user may provide commands to modify the presentation of the document or any resource within the document. A user interface is provided to allow the user to specify the desired page locations, rotations, and scaling for each object on each signature. The user can also specify collateral information such as cut marks and spine text. The user commands are accepted in the imposition engine 314. A new skeleton document 602 is created in accordance with the user command(s), and the document is rendered using the modified skeleton document and the loaded resources.

The print server 306 need only support conversion from the data resources from the mixed object data structure (e.g. MO:DCA) format to an format suitable for the printer 308 (such as IPDS). The printer server 306 can manage printer resources from print job to print job by simply sending a command to reference a resource that was already downloaded into the printer server 306 or the printer 308. Thus, user document modifications such as a change in the location of an object results in a small IOB change and hence, little effort is required to render the modified document. Also, user document modifications such as a changes in rotation or scaling involves significantly less processing and message traffic than would prior art methods of reprocessing the entire object. Collateral input information such as cut marks and spine text added to a page are typically small sized unmapped data, and can be processed independently.

Figure 7D:
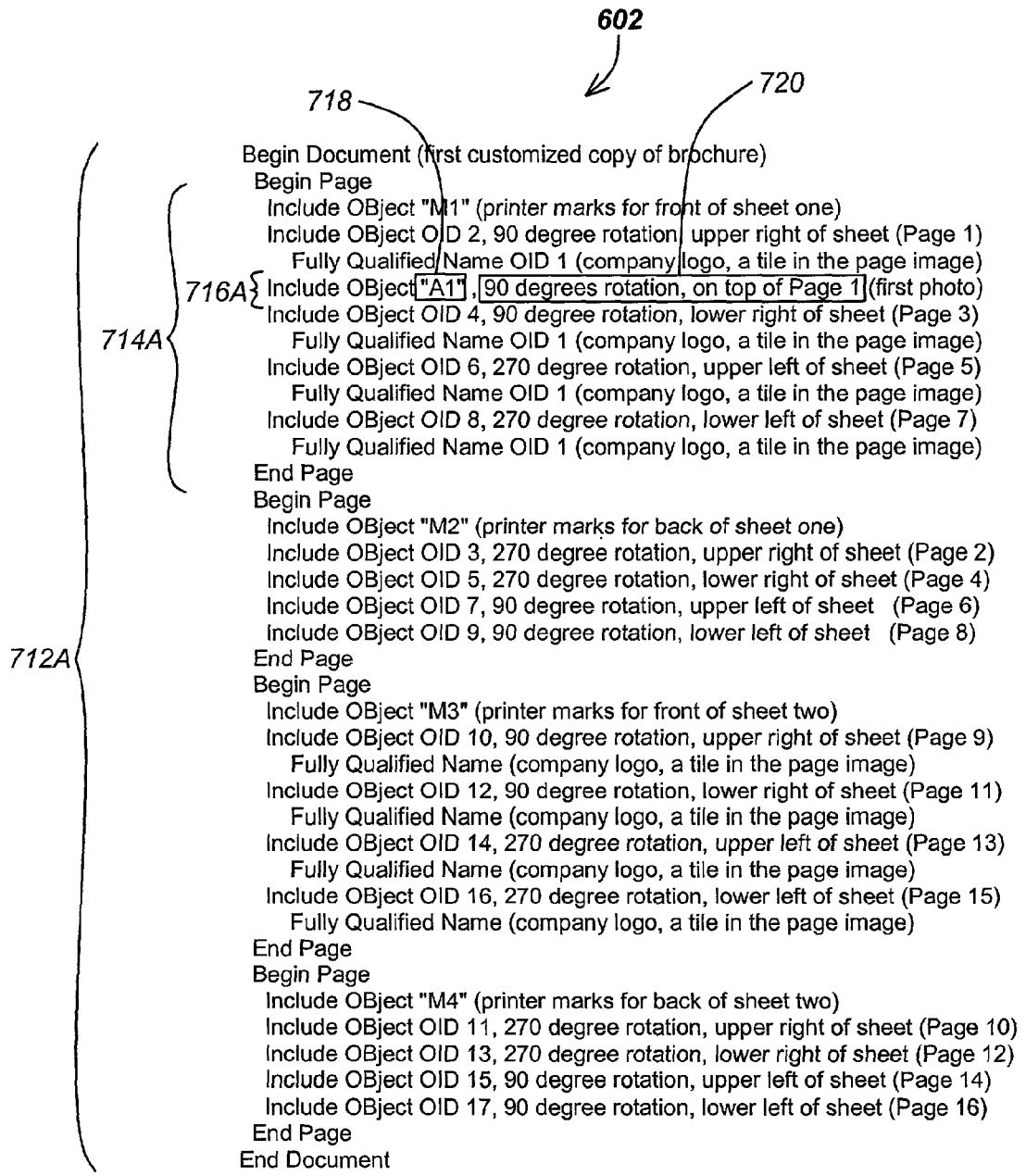

FIGS. 7A-7E are diagrams of an exemplary skeleton document 602. As shown in FIG. 7A, the skeleton document 602 includes one or more resource groups 702, each comprising one or more resource definitions 703. Resource definitions 703 includes inline resources such as first resource (denoted "M1") that are the printer marks for the front of sheet 1 of the impositioned document, and other resources such as variable data resource (denoted "A1"). Each resource is delineated by a "begin resource" and "end resource" statement. Definitions 705 refer to variable data "A1" which, in this example, is a picture of a first insurance agent.

As shown in FIG. 7B, the skeleton document 602 also includes a resource environment group 706, defining mapping 706 for one or more data resources and structured fields. Resources including printer marks (denoted by an "M"), pictures (denoted by an "A"), and pages (denoted by an "R") are indicated. The map data resource instruction finds the resource indicated in the structured field (e.g. "M1," "A1," "A1," or "R3") and, if the resource is not locally available to the printer, downloads the resource to the printer. As shown in relation to resource A2, an OID (OID 0) is associated with the image (in this case, an image of a second insurance agent).

As shown in FIG. 7C, the resource environment group 706 also includes operations 710 to preprocess the resources. This preprocessing can include object rotations, scaling, or other preprocessing. In some cases, preprocessing of objects requires access to another object. In such cases, instructions are provided specifying the fully qualified name of such required objects (e.g. in the example illustrated in FIG. 7C, the preprocessing of the object identified by "OID 3" requires the object identified by "OID 1."

As shown in FIG. 7D, the skeleton document 602 includes a document description 712A, delineated by "begin document" and "end document" statements. The document description 712A includes a page description 714A comprising one or more "include OBject" commands, a structured field 718 identifying the resource and a second structured field 720 defining a presentation of the resource. Each page description is delineated by a "begin page" and "end page" statement.

As shown in FIG. 7E, the skeleton document 602 also includes a information regarding a second copy of the impositioned document, with a minor change. In the illustrated example, a photograph of a second insurance agent (resource "A2") is substituted for the photograph (resource "A1"). All other aspects of the skeleton document are the same. If resource "A2" has not already been loaded into the printer, the "Include OBject" operation causes the object to be loaded for printing. If the resource "A2" has already been loaded, the object is not reloaded. As can be seen by comparing FIGS. 7D and 7E, the only change between the impositioned documents is the substitution of resource "A2" for resource "A1" (these resources were variable data). Since all of the resources are already locally available to the printer, the printing of the second copy of the document is expedited and requires less processing and transmission of data.

The impositioning system and method described above has several advantages of the prior art methods. Enhancements can be made to the imposition engine or print optimizer independent of the print server. Resources used in documents can be stored across power shutdowns at the printer 308, allowing the job to be reprinted immediately when power is restored. The use of unique resource identifiers ensures data integrity, and reduces the time for modified document content to be loaded to the printer because only modifications to the resources or the document are loaded into the printer.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing describes the generation of a new skeleton document in response to impositioned document changes, the system may be implemented by modifying the skeleton document or job ticket, rather than generating a new one.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of printing an impositioned document, comprising the steps of:

receiving a print job including page content of the impositioned document;

creating a first imposition layout of the impositioned document based on the page content;

receiving a first job ticket generated from the page content, the first job ticket including an identifier identifying a resource included in the impositioned document and layout information describing the first imposition layout of the resource in the impositioned document;

determining whether the resource is locally stored on a printing device by:

determining a checksum of the resource;

comparing the checksum of the resource to other checksums of resources locally stored on the printing device; and determining that the resource is locally stored on the printing device if another checksum matches the checksum of the resource;

storing the resource locally on the printing device responsive to determining that the resource is not locally stored on the printing device;

printing the impositioned document based on the first job ticket using the resource locally stored on the printing device;

receiving a second job ticket referencing the identifier of the resource in the impositioned document; and printing the impositioned document based on the second job ticket using the resource locally stored on the printing device.

2. The method of claim 1, wherein the resource comprises a page of the impositioned document.

3. The method of claim 1, wherein the second job ticket includes second layout information describing a second impositioning layout of the resource in the impositioned document.

4. The method of claim 1, wherein the impositioned document comprises variable data, and the method further comprises the step of:

augmenting the first or second job ticket with the variable data.

5. The method of claim 4, wherein the step of augmenting the first or second job ticket with variable data comprises the steps of:

receiving the page content including variable data tags;

determining customized data corresponding with the variable data tags;

inserting the customized data into the first or second job ticket; and printing the impositioned document using the customized data in the first or second job ticket, the customized data replacing the variable data tags.

6. The method of claim 1, further comprising the step of:
converting the resource to a printer-renderable format if the resource is not in the printer-renderable format.

7. The method of claim 6, wherein the printer-renderable format is compliant with a page description language.

8. The method of claim 1, wherein the resource is stored in a memory of the printing device or in a memory of a print server communicatively coupled to the printing device.

9. The method of claim 1, further comprising the step of:
normalizing the resource into a series of pages.

10. An apparatus for printing an impositioned document, comprising:

means for receiving a print job including page content of the impositioned document;

means for creating a first imposition layout of the impositioned document based on the page content;

means for receiving a first job ticket generated from the page content, the first job ticket including an identifier identifying a resource included in the impositioned document and layout information describing the first imposition layout of the resource in the impositioned document;

means for determining a checksum of the resource;

means for comparing the checksum of the resource to other checksums of resources locally stored on the printing device;

means for determining that the resource is locally stored on the printing device if another checksum matches the checksum of the resource;

means for storing the resource locally on the printing device responsive to determining that the resource is not locally stored on the printing device;

means for printing the impositioned document based on the first job ticket using the resource locally stored on the printing device;

means for receiving a second job ticket referencing the identifier of the resource in the impositioned document; and means for printing the impositioned document based on the second job ticket using the resource locally stored on the printing device.

11. The apparatus of claim 10, wherein the resource comprises a page of the impositioned document.

12. The apparatus of claim 10, wherein the second job ticket includes second layout information describing a second impositioning layout of the resource in the impositioned document.

13. The apparatus of claim 10, wherein the impositioned document comprises variable data, and the apparatus further comprises:

means for augmenting the first or second job ticket with the variable data.

14. The apparatus of claim 10, further comprising:

means for receiving the page content including variable data tags;

means for determining customized data corresponding with the variable data tags;

means for inserting the customized data into the first or second job ticket; and means for printing the impositioned document using the customized data in the first or second job ticket, the customized data replacing the variable data tags.

15. The apparatus of claim 10, further comprising:

means for converting the resource to a printer-renderable format if the resource is not in the printer-renderable format.

16. The apparatus of claim 15, wherein the printer-renderable format is compliant with a page description language.

17. The apparatus of claim 10, wherein the resource is stored in a memory of the printing device or in a memory of a print sewer communicatively coupled to the printing device.

18. The apparatus of claim 10, further comprising:
normalizing the resource into a series of pages.

19. A computer-readable medium, tangibly embodying at least one program of instructions executable by the computer to perform method steps of printing an impositioned document, the method steps comprising the steps of:

receiving a print job including page content of the impositioned document;

creating a first imposition layout of the impositioned document based on the page content;

receiving a first job ticket generated from the page content, the first job ticket including an identifier identifying a resource included in the impositioned document and layout information describing the first imposition layout of the resource in the impositioned document;

determining whether the resource is locally stored on a printing device by:
   determining a checksum of the resource;
   comparing the checksum of the resource to other checksums of resources locally stored on the printing device; and
   determining that the resource is locally stored on the printing device if another checksum matches the checksum of the resource;
storing the resource locally on the printing device responsive to determining that the resource is not locally stored on the printing device;
printing the impositioned document based on the first job ticket using the resource locally stored on the printing device;
receiving a second job ticket referencing the identifier of the resource in the impositioned document; and
printing the impositioned document based on the second job ticket using the resource locally stored on the printing device.

20. The computer-readable medium of claim 19, wherein the resource comprises a page of the impositioned document.

21. The computer-readable medium of claim 19, wherein the second job ticket includes second layout information describing a second impositioning layout of the resource in the impositioned document.

22. The computer-readable medium of claim 19, wherein the impositioned document comprises variable data, and the method steps further comprise:
   augmenting the first or second job ticket with the variable data.

23. The computer-readable medium of claim 22, wherein the method step of augmenting the first or second job ticket with variable data further comprises:
   receiving the page content including variable data tags;
   determining customized data corresponding with the variable data tags;
   inserting the customized data into the first or second job ticket; and
   printing the impositioned document using the customized data in the first or second job ticket, the customized data replacing the variable data tags.

24. The computer-readable medium of claim 19, wherein the method steps further comprise:
   converting the resource to a printer-renderable format if the resource is not in the printer-renderable format.

25. The computer-readable medium of claim 24, wherein the printer-renderable format is compliant with a page description language.

26. The computer-readable medium of claim 19, wherein the resource is stored in a memory of the printing device or in a memory of a print server communicatively coupled to the printing device.

27. The computer-readable medium of claim 26, wherein the method steps further comprise:
   normalizing the resource into a series of pages.

* * * * *

UNITED STATES PATENT AND TRADEMARK OFFICE
CERTIFICATE OF CORRECTION

PATENT NO.        : 7,515,297 B2
APPLICATION NO. : 10/056857
DATED             : April 7, 2009
INVENTOR(S)       : Wardell et al.

It is certified that error appears in the above-identified patent and that said Letters Patent is hereby corrected as shown below:

At column 10, line 52, the text "a print sewer" should read --a printer server--.

Signed and Sealed this

Twenty-third Day of June, 2009

JOHN DOLL
*Acting Director of the United States Patent and Trademark Office*